INVENTOR
JOHN K. ROSKAMP

INVENTOR
JOHN K. ROSKAMP
BY
ATTORNEY

Sept. 12, 1961     J. K. ROSKAMP     2,999,449
STOCK FEED GRINDING AND MIXING APPARATUS
Filed Aug. 16, 1960     4 Sheets-Sheet 4
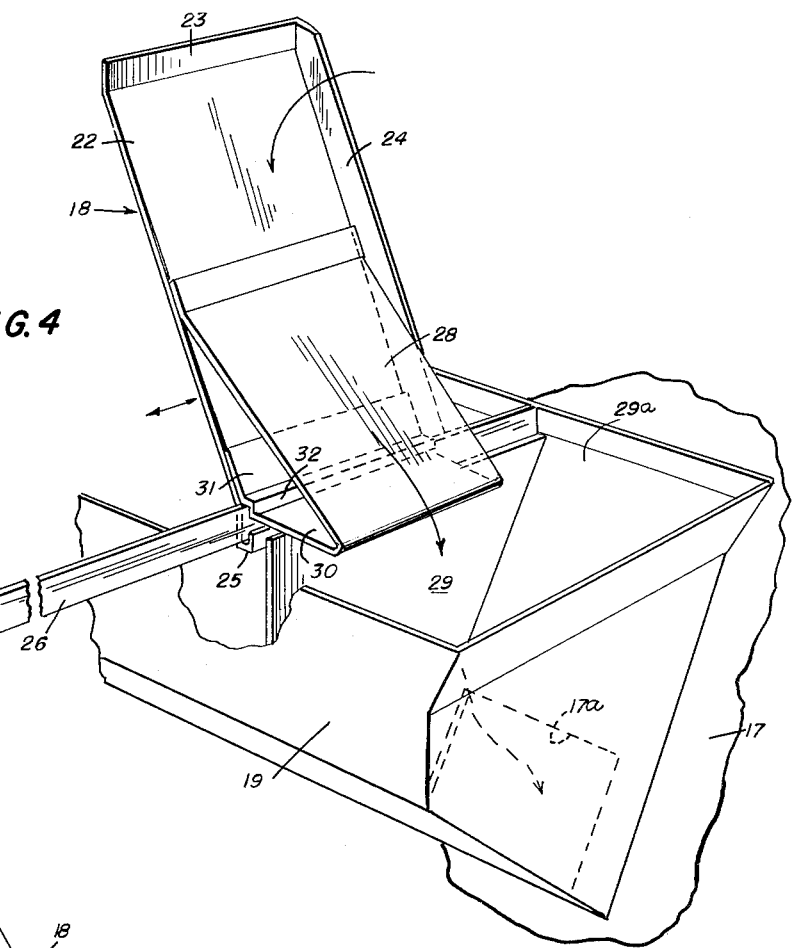
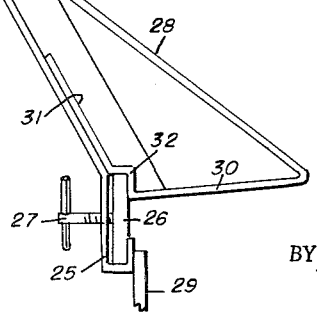
INVENTOR
JOHN K. ROSKAMP
ATTORNEY

United States Patent Office 2,999,449
Patented Sept. 12, 1961

2,999,449
STOCK FEED GRINDING AND MIXING APPARATUS
John K. Roskamp, 616 Grand Blvd., Cedar Falls, Iowa
Filed Aug. 16, 1960, Ser. No. 49,969
8 Claims. (Cl. 99—235)

This invention relates to apparatus for preparing ground stock feed and consists more particularly in new and useful improvements in a machine designed to provide the stock feeder with a unitary plant which will shell ear corn, crack the shelled corn, grind the cobs and selectively proportion the amount of ground corncobs to be incorporated in the final feed mixture.

Cattle feeding operations have become an increasingly large industry in which feeder cattle are purchased from breeders and confined in feed lots where carefully proportioned feed mixtures are fed for varying periods of time and in varying proportions of ingredients as the feeding program progresses. For example, at the start of the feeding period the ears of corn are usually completely ground including the cob and this entire mixture of cracked corn and cob is consumed by the animals. As the feeding period progresses and the cattle are being finally fattened, the proportion of ground cobs included in the mixture is gradually reduced so that the mixture consumed is largely cracked or rolled corn. Heretofore, it has been necessary to grind all of the cobs as they came from the corn sheller and then separately add to the cracked corn the desired proportion of ground corncobs, manually varying the proportion so added, as the program proceeded. This has naturally been a time-consuming operation in addition to requiring numerous impractical and complicated mechanisms and procedures.

It is the primary object of the present invention to provide a combined apparatus including a corn sheller, a rolling mill, a hammer mill, and a novel proportioning device arranged to introduce into the hammer mill for subsequent admixture with cracked corn, a selected proportion of ground corncobs, to thereby produce with a single machine, any desired feed mixture suitable for any feeding period throughout the feeding program.

Another object of the invention is to provide a proportioning gate associated with the corncob disposal conveyor which can be adjusted so as to permit the complete discharge of corncobs or to selectively intercept the desired proportion of corncobs to be introduced to the hammer mill for grinding and admixture with the ultimate feed product.

A further object of the invention is to provide a combined feed processing plant which is simple in construction and operation and possesses features of adjustability enabling the operator to automatically produce the exact feed mixture he desires.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views:

FIGURE 4 shows an enlarged fragmentary perspective view showing the corncob proportioning gate; and FIGURE 5 is a side elevational view of the proportioning gate.

At the outset, it may be stated that the individual processing units of the apparatus are conventional and the invention resides in the relationship of such units to one another and the association therewith of the improved corncob proportioning device.

Figure 1:
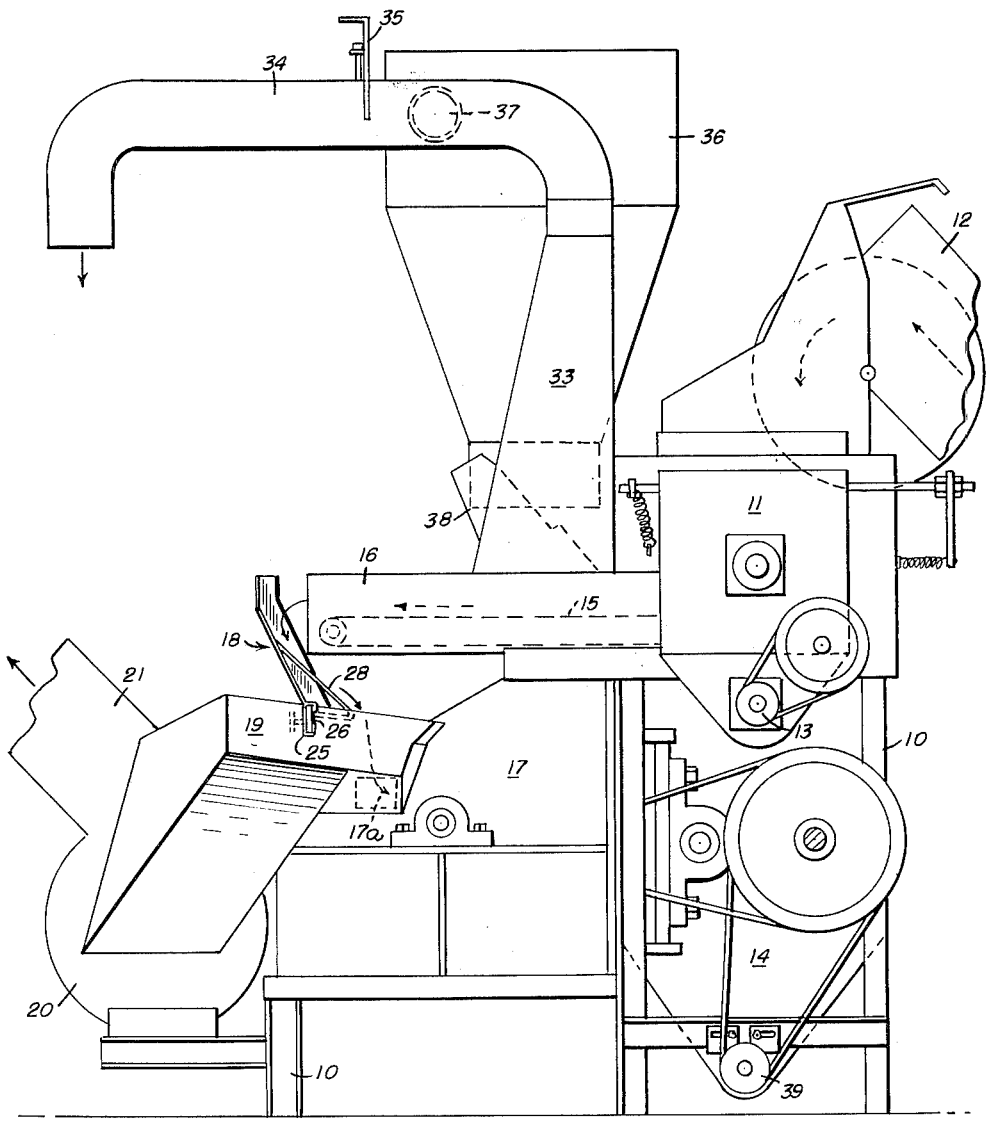
FIG. 1 is a side elevational view of the combined apparatus, showing the various processing units more or less diagrammatically.

In the drawings, referring first to FIG. 1, it will be seen that the apparatus is supported by suitable frame work 10 and includes a conventional corn sheller 11 into which whole ears of corn are fed by a product feed elevator 12. A screw feeding device 13 conveys the shelled corn to a conventional roller mill diagrammatically shown at 14 and located below the corn sheller, the denuded cobs being carried away from the sheller by an endless conveyor belt 15 disposed in a horizontal trough 16. The rolls (not shown) of the roller mill 14 may be adjusted in the conventional manner to provide the desired final rolled corn size and, depending upon the particular period of the feeding program, certain proportions of ground corncob are mixed with the shelled corn which has been introduced into the roller mill 14. To accomplish this admixture of corncobs with the shelled corn, a conventional hammer mill 17 is provided adjacent the roller mill 14, said hammer mill being fed with a selected quantity of corncobs which are intercepted in the desired proportions as they leave the corncob conveyor belt 15 and trough 16.

As best seen in FIGS. 1 and 4, the inlet duct 19 of a cob discharge fan 20 is located immediately adjacent and below the discharge end of the trough 16 whereby, whole cobs after leaving the corn sheller 11 are conducted to and through the discharge chute 21. The cob proportioning device consists of an angularly disposed gate generally indicated at 18, and arranged for lateral sliding movement across the path of the corncobs being discharged from the trough 16, the selected position of said gate with respect to the discharge end of said chute 16 and the opening of the inlet duct 19, determining the proportion of whole corncobs to be intercepted and returned to the apparatus for grinding.

This gate 18 is preferably formed of galvanized sheet metal and is mounted for transverse sliding movement on the inlet duct 19, by means of a bar 26 which lies across the inlet duct 19 and projects laterally beyond one side thereof a sufficient distance to permit the gate to be completely withdrawn from the path of the discharged corncobs or to be adjusted to any selected position across such path to regulate the proportion of corncobs intercepted. Referring to FIGS. 4 and 5, the gate consists of a main backing sheet 22, the top edge and one side edge of which are bounded by angularly disposed flanges 23 and 24 respectively, positioned to facilitate the interception and control of corncobs. The bottom edge of the main backing sheet 22 is provided with a transverse guide channel 25 adapted to slidably embrace the supporting bar 26, a set screw 27 extending through the channel 25 for locking the gate 18 in a selected location on the bar as best seen in FIG. 5.

A vertical partition 29 extends across the inlet duct 19 and defines therein a feed chamber 29a arranged in communication with the hammer mill 17 through an inlet opening 17a, whereby cobs diverted to the feed chamber 29a are prevented from entering the main hopper 19 for discharge by fan 20 and discharge chute 21.

To further facilitate the interception and direction of travel of the selected proportion of whole corncobs, a cob directing baffle 28 is preferably spot-welded to the forward face of the backing sheet 22. This baffle projects angularly from the backing plate 22 and overhangs the feed chamber 29a as seen in FIG. 4, its lower edge being bent rearwardly at an acute angle as at 30 and terminating in a connecting plate 31 which lies flush with the backing plate 22 and is spot-welded thereto. Preferably, intermediate the mounting plate 31 and the rearwardly bent portion 30, the strip 28 is bent as at 32 to form a shoulder which overlies the guide bar 26 and forms the upper boundary of the guide channel 25.

The discharge end of the hammer mill 17 is connected to a vertical conduit 33 which terminates in communication with a corncob discharge chute 34 having a damper 35 which may be adjusted to permit the entire volume of ground cobs from the hammer mill to be discharged through the duct 34 or diverted to the feed mixture through a conventional cyclone 36.

Figure 2:
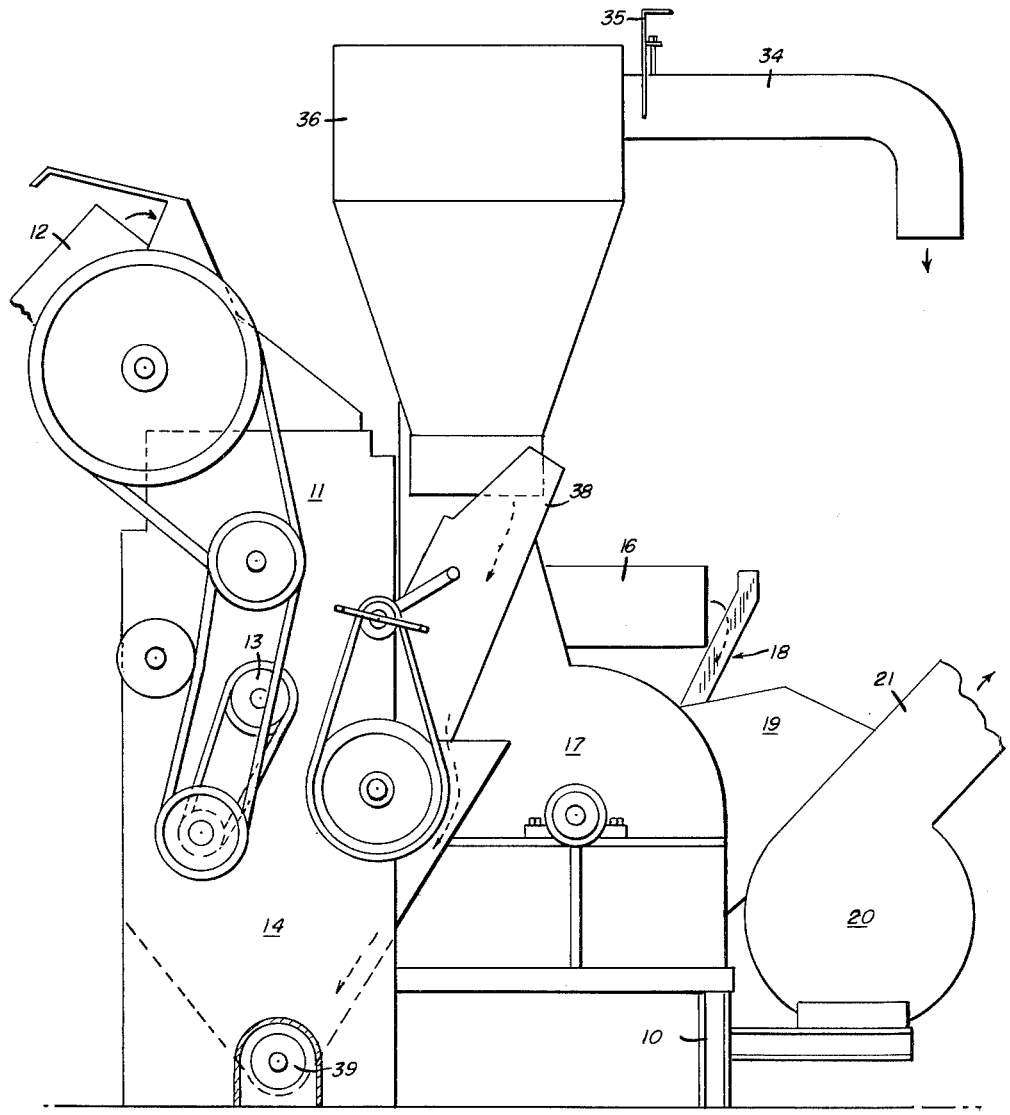
FIG. 2 is an elevational view from the opposite side of the apparatus.
Figure 3:
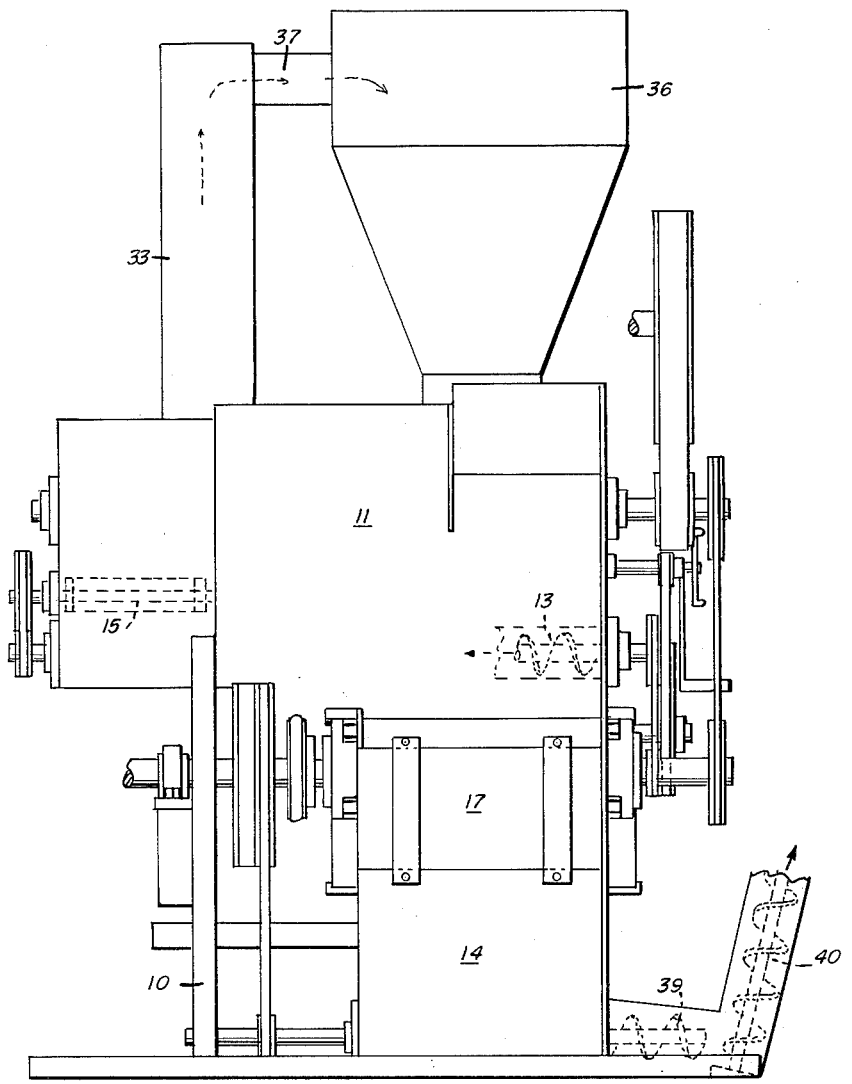
FIGURE 3 is an end elevational view of the apparatus.

Anterior to the damper 35, the chute 34 is connected to the upper end of the cyclone 36 by a laterally extending conduit 37 as best seen in FIG. 3, the cyclone in turn, discharging the ground corncobs into a chute 38 which conducts the ground corncobs to the roller mill 14 as best seen in FIG. 2, where they are admixed with the rolled shell corn, the mixture then being discharged from the hammer mill by means of a horizontal screw conveyor 39 which conducts it to an elevating screw conveyor 40 (FIG. 3) arranged to deliver the final product to a wagon or storage bin.

It is believed unnecessary to go into the details of construction and operation of the various individual units of this apparatus or, as before stated, they may be conventional in construction. However, it may be stated briefly that in operation, the whole ears of corn are fed to the plant by the elevator chute 12 which deposits them in the corn sheller 11. The shelled corn is conducted from the sheller 11 by means of screw conveyor 13 to the roller mill 14 where the kernels of corn are cracked and rolled in the usual manner. The corncobs are discharged from the sheller 11 by means of the conveyor belt 15 and trough 16 and at this point, the proportioning of the corncobs to be ground for admixture with the feed product is determined. By laterally adjusting the proportioning gate 18 on the transverse rod 26, the operator can cause the gate and baffle 28 to intercept any desired proportion of corncobs to be deflected into the inlet chamber 19a for introduction through the inlet opening 17a of the hammer mill 17. In other words, the relationship of the gate 18 with respect to the discharge end of the trough 16 and the inlet chamber 19a determines the proportions of corncobs which are deflected for return to the apparatus and those which by-pass the gate 18 and continue their travel through the duct 19, discharge fan 20, and discharge chute 21.

From the hammer mill 17 the ground corncobs which have been returned for admixture are conducted through the discharge conduit 33 at which point a further selection may be made by the operator. That is, the entire quantity of ground corncobs may be discharged through the discharge chute 34 by simply opening the damper 35, or said ground corncobs may be returned through connection 37 and the cyclone 36, to the roller mill for admixture with the rolled corn. The cyclone is necessary at this point to separate the ground corncobs from the high speed air stream coming from the hammer mill 17.

The final mixture is then conducted from the roller mill by means of the screw conveyor 39 and thence discharged through the elevator screw 40 to a wagon or storage bin.

It will be apparent that with this combined assembly, there is provided an extremely versatile machine by means of which stock feed of any desired mixture and proportion may be produced. The operator may confine the operation to cracking shelled corn through the roller mill, he can shell corn and dispose of all of the cobs by means of the whole cob discharge fan and chute, he can use either dry or liquid molasses mixed with the feed, or he can produce a mixture including ground corncobs in selected proportions.

From the foregoing, it is believed that the invention may be readily understood by those skilled in the art without further description, it being borne in mind that numerous changes may be made in the details disclosed without departing from the spirit of the invention as set forth in the following claims.

I claim:

1. Stock feed grinding and mixing apparatus, comprising in combination, a corn sheller, means for feeding ears of corn to said sheller, a roller mill, means for conducting shelled corn from said sheller to said roller mill, a hammer mill, means for conveying whole corncobs from said shelter, means associated with said last-named means for diverting a selected proportion of said whole corncobs to said hammer mill for grinding, means for conducting ground corncobs from said hammer mill to said roller mill for admixture with the shelled corn undergoing processing therein, means for discharging from the apparatus the unselected portion of said whole corncobs, and means for discharging the final feed product from said roller mill.

2. Stock feed grinding and mixing apparatus, comprising in combination, a corn sheller, means for feeding ears of corn to said sheller, a roller mill, means for conducting shelled corn from said sheller to said roller mill, a hammer mill, means for conveying whole corncobs from said sheller, means associated with said last-named means for diverting a selected proportion of said whole corncobs to said hammer mill for grinding, a discharge conduit leading from said hammer mill, a cyclone separator, means for by-passing ground corncobs from said conduit to said cyclone separator for separating ground cobs from the high speed air stream from said hammer mill, means for conducting said separated ground corncobs to said roller mill for admixture with the shelled corn undergoing processing therein, means for discharging from the apparatus the unselected portion of said whole corncobs, and means for discharging the final feed product from said roller mill.

3. Stock feed grinding and mixing apparatus, comprising in combination, a corn sheller, means for feeding ears of corn to said sheller, a roller mill, means for conducting shelled corn from said sheller to said roller mill, a hammer mill, means for conveying whole corncobs from said sheller, a corncob discharge fan having an inlet duct positioned to receive corncobs from said conveyor means, a proportioning gate slidably disposed for transverse adjustment in the path of corncobs being conveyed to said inlet duct, for diverting a selected proportion of said whole corncobs to said hammer mill for grinding, means for conducting ground corncobs from said hammer mill to said roller mill for admixture with the shelled corn undergoing processing therein, and means for discharging the final feed product from said roller mill.

4. Apparatus as claimed in claim 3, wherein said proportioning gate comprises an inclined plate slidably mounted on a supporting bar extending transversely across said inlet duct, said plate being shiftable on said bar to position a selected area thereof in the path of said discharged corncobs.

5. Apparatus as claimed in claim 4, including means for locking said proportioning gate in a selected position on said bar.

6. In combination with a corn shelling unit, a whole cob discharge unit having a cob receiving duct, and a corncob grinding unit; a cob proportioning gate for intercepting a selected proportion of discharged whole cobs for grinding, said gate comprising a baffle member slidably supported above said duct for lateral adjustment in the path of the discharged corncobs, said baffle being inclined to divert the intercepted whole cobs to said grinding unit.

7. The combination as claimed in claim 6, wherein said baffle member is bounded on at least two edges by angularly disposed flanges for confining the intercepted cobs.

8. In combination, a corn sheller unit, a whole cob discharge unit having a cob receiving duct, a corncob grinding unit, a vertical partition transversely dividing said duct into a discharge chamber and a grinding unit feed chamber, a cob proportioning gate for intercepting a selected proportion of discharged whole cobs for grinding, said gate comprising a baffle member slidably supported above said duct for lateral adjustment in the path of the discharged corncobs, said baffle being inclined to forwardly overhang said grinding unit feed chamber for diverting the intercepted whole cobs to the latter.

References Cited in the file of this patent

UNITED STATES PATENTS 2,970,532     Skelton _____ Feb. 7, 1961